(12) United States Patent
Yi et al.

(10) Patent No.: US 10,268,723 B2
(45) Date of Patent: Apr. 23, 2019

(54) METHOD AND APPARATUS FOR EXECUTING QUERY AND COMPUTER READABLE MEDIUM THEREFOR

(71) Applicant: TmaxData Co., Ltd., Gyeonggi-do (KR)

(72) Inventors: Sukwon Yi, Gyeonggi-do (KR); Youngjae Choi, Gyeonggi-do (KR); Kyungtae Lee, Gyeonggi-do (KR); Seungkeol Kim, Gyeonggi-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 253 days.

(21) Appl. No.: 15/220,005

(22) Filed: Jul. 26, 2016

(65) Prior Publication Data

US 2017/0364557 A1    Dec. 21, 2017

(30) Foreign Application Priority Data

Jun. 20, 2016   (KR) .................. 10-2016-0076235

(51) Int. Cl.
    *G06F 17/30*        (2006.01)
(52) U.S. Cl.
    CPC .. *G06F 17/30451* (2013.01); *G06F 17/30318* (2013.01)
(58) Field of Classification Search
    None
    See application file for complete search history.

(56) References Cited

U.S. PATENT DOCUMENTS

| 6,065,013 | A  | * | 5/2000  | Fuh .................. G06F 17/30607 |
| 6,457,021 | B1 |   | 9/2002  | Berkowitz et al. |
| 6,604,095 | B1 | * | 8/2003  | Cesare ............. G06F 17/30595 |
| 6,738,790 | B1 | * | 5/2004  | Klein ................. G06F 17/3061 |
| 7,111,005 | B1 |   | 9/2006  | Wessman |
| 7,639,819 | B2 |   | 12/2009 | Ho et al. |
| 8,756,261 | B2 |   | 6/2014  | Pfeifle et al. |

(Continued)

FOREIGN PATENT DOCUMENTS

| KR | 10-2006-0037196 | 5/2006 |
| KR | 10-2006-0058546 | 5/2006 |

(Continued)

OTHER PUBLICATIONS

U.S. Appl. No. 14/733,819, filed Jun. 8, 2015, Yoon, et al.

(Continued)

*Primary Examiner* — Alex Gofman
*Assistant Examiner* — Umar Mian
(74) *Attorney, Agent, or Firm* — Rutan & Tucker LLP

(57) ABSTRACT

Provided is a method for executing a query in a DBMS. The method may include: receiving a query statement for requesting BLOB data serialized to a binary large object (BLOB) type and stored in a pivot table; determining name information for one or more columns generated as a result of a pivot operation included in respective pivot columns of the pivot table by querying a pivot name table for the pivot table; determining internal storage type information of the pivot table by querying a pivot meta table for the pivot table; and generating output information for the BLOB data corresponding to the query statement based on the determined name information and internal storage type information.

10 Claims, 9 Drawing Sheets

(56) References Cited

U.S. PATENT DOCUMENTS

| | | | |
|---|---|---|---|
| 8,949,603 | B2 | 2/2015 | Moon |
| 8,977,597 | B2 | 3/2015 | Ganesh et al. |
| 8,997,041 | B2 | 3/2015 | Lee |
| 9,071,884 | B2 | 6/2015 | Joung |
| 2002/0087500 | A1 | 7/2002 | Berkowitz et al. |
| 2006/0041533 | A1 | 2/2006 | Koyfman |
| 2008/0263114 | A1 | 10/2008 | Nath et al. |
| 2011/0252000 | A1 | 10/2011 | Diaconu et al. |
| 2013/0346378 | A1 | 12/2013 | Tsirogiannis et al. |
| 2014/0025651 | A1 | 1/2014 | Schreter |
| 2014/0067767 | A1 | 3/2014 | Ganesh et al. |
| 2015/0019514 | A1* | 1/2015 | Forster .............. G06F 17/30961 707/693 |
| 2015/0142775 | A1* | 5/2015 | Kang ................ G06F 17/30466 707/714 |
| 2015/0186266 | A1 | 7/2015 | Schreter |

FOREIGN PATENT DOCUMENTS

| | | |
|---|---|---|
| KR | 1020110014413 | 2/2011 |
| KR | 1020110138946 | 12/2011 |
| KR | 1020120118550 | 10/2012 |
| WO | WO2001/048638 | 12/2000 |
| WO | WO2005/083594 | 9/2005 |
| WO | WO 2008/048748 | 4/2008 |

OTHER PUBLICATIONS

U.S. Appl. No. 14/733,778, filed Jun. 8, 2015, Yoon, et al.
U.S. Appl. No. 15/085,871, filed Mar. 30, 2016, Seo, et al.
U.S. Appl. No. 15/085,874, filed Mar. 30, 2016, Seo, et al.
Cyran, Michele, "Oracle® Database Concepts 10g Release 2 (10.2) B14220-02", 542 Pages. Oct. 2005. Copyright 1993, 2005, Oracle.
Huey, Patricia, "Oracle® Database 2 Day + Security Guide, 11g Release 2 (11.2) E10575-09", 124 Pages. Nov. 2013. Copyright 2006, 2013, Oracle.

* cited by examiner

Fig. 6

| SGMT_ID | COL_ID | IDX |
|---------|--------|-----|
| NAME    |        |     |
| 1970    | 1      | 0   |
| GREEN_COL |      |     |
| 1970    | 1      | 1   |
| RED_COL |        |     |
| 1970    | 1      | 2   |
| YELLOW_COL |     |     |

Fig. 7

| SGMT_ID | COL_ID | IDX | TYPE |
|---------|--------|-----|------|
| AGGR_NAME | | | |
| 1978 | 1 | 0 | 1 |
| K_COL | | | |

Fig. 8

```
1 column_type : 12
2 column_type : 27
PivotNameTable0 : GREEN_COL(0) RED_COL(1) YELLOW_COL(2)

column count = 2
row0 : ITEM1    [60.0(0), 20.0(1), 40.0(2)]
row1 : ITEM2    [30.0(0), 10.0(1)]
```

METHOD AND APPARATUS FOR EXECUTING QUERY AND COMPUTER READABLE MEDIUM THEREFOR

CROSS-REFERENCE TO RELATED APPLICATIONS

This application claims priority to and the benefit of Korean Patent Application No. 10-2016-0076235 filed in the Korean Intellectual Property Office on 20 Jun. 2016, the entire contents of which are incorporated herein by reference.

TECHNICAL FIELD

The present disclosure relates to query execution in a database management system (DBMS), and more particularly, to a technique that performs a pivot calculation in the database management system.

BACKGROUND ART

The business of enterprises has rapidly expanded with the explosive increase of data and appearance of various environments and platforms. With the advent of a new business environment, more efficient and flexible processing of a data service and information and a more efficient and flexible data management function are required. According to such a change, research into a database for solving problems in high performance, high availability and extensibility which are the basis of enterprise business implementation has continued.

In a database management system (DBMS), data can be stored in a data storage. In a relational database management system (RDBMS), the data storage may be designated as a table. The table can include one or more rows and each of one or more rows can include one or more columns.

When the database includes a large quantity of data or a large capacity of data is stored in the database, a relatively long time can be required for performing a query for retrieving data in which a user has an interest. When a lot of time is required for the database to respond to the query, a bad influence can be exerted on performance of the database.

Large-capacity objects in the DBMS in the related art are stored as a large object (LOB) or binary large object (BLOB) data type in order to overcome a limit for an excessively large capacity. However, as disclosed in Prior U.S. Pat. No. 8,756,261, only LOB or BLOB metadata is stored in a relational table and the LOB or BLOB data cannot but be stored outside the table as a separate file type.

Moreover, a pivot calculation is performed in order to extend a schema by performing an aggregation query with respect to a specific condition in the DBMS in the related art. When the pivot calculation is performed, since multiple pivot columns are additionally automatically generated, there are difficulties such as the need for modifying a complicated SQL statement, and the like in order for the user to perform the additional calculation by using the multiple pivot columns.

SUMMARY OF THE INVENTION

The present disclosure has been made in an effort to efficiently store, query, and output an execution result for a pivot calculation in a BLOB type.

An exemplary embodiment of the present disclosure provides a computer program stored in a computer-readable medium including encoded commands. In the computer program which allows, when the computer program is executed by one or more processor of a computer system, one or more processors to perform following operations for executing a query in a database management system (DBMS), the operations include: The operations may include: an operation of receiving a query statement for requesting BLOB data serialized to a binary large object (BLOB) type and stored in a pivot table; an operation of determining name information for one or more columns generated as a result of a pivot operation included in respective pivot columns of the pivot table by querying a pivot name table for the pivot table; an operation of determining internal storage type information of the pivot table by querying a pivot meta table for the pivot table; and an operation of generating output information for the BLOB data corresponding to the query statement based on the determined name information and internal storage type information.

Another exemplary embodiment of the present disclosure provides an apparatus for executing a query. The apparatus may include: a communication module receiving a query statement for requesting BLOB data serialized to a binary large object (BLOB) type and stored in a pivot table; a pivot name table query module determining name information for one or more columns generated as a result of a pivot operation included in respective pivot columns of the pivot table by querying a pivot name table for the pivot table; a pivot name table query module determining internal storage type information of the pivot table by querying a pivot meta table for the pivot table; and an output information generating module generating output information for the BLOB data corresponding to the query statement based on the determined name information and internal storage type information.

Yet another exemplary embodiment of the present disclosure provides a method for executing a query in a DBMS. The method may include: receiving a query statement for requesting BLOB data serialized to a binary large object (BLOB) type and stored in a pivot table; determining name information for one or more columns generated as a result of a pivot operation included in respective pivot columns of the pivot table by querying a pivot name table for the pivot table; determining internal storage type information of the pivot table by querying a pivot meta table for the pivot table; and generating output information for the BLOB data corresponding to the query statement based on the determined name information and internal storage type information.

According to exemplary embodiments of the present disclosure, an execution result for a pivot calculation can be efficiently stored, queried, and output in a BLOB type.

BRIEF DESCRIPTION OF THE DRAWINGS

Various aspects are now described with reference to the drawings and like reference numerals are generally used to designate like elements. In the following exemplary embodiments, for description, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

FIG. 6 illustrates an exemplary query result screen for a pivot name table according to an exemplary embodiment of the present disclosure.

FIG. 7 illustrates an exemplary query result screen for a pivot meta table according to an exemplary embodiment of the present disclosure.

FIG. 8 illustrates exemplary output information for BLOB data stored according to an exemplary embodiment of the present disclosure.

DETAILED DESCRIPTION

Figure 1:
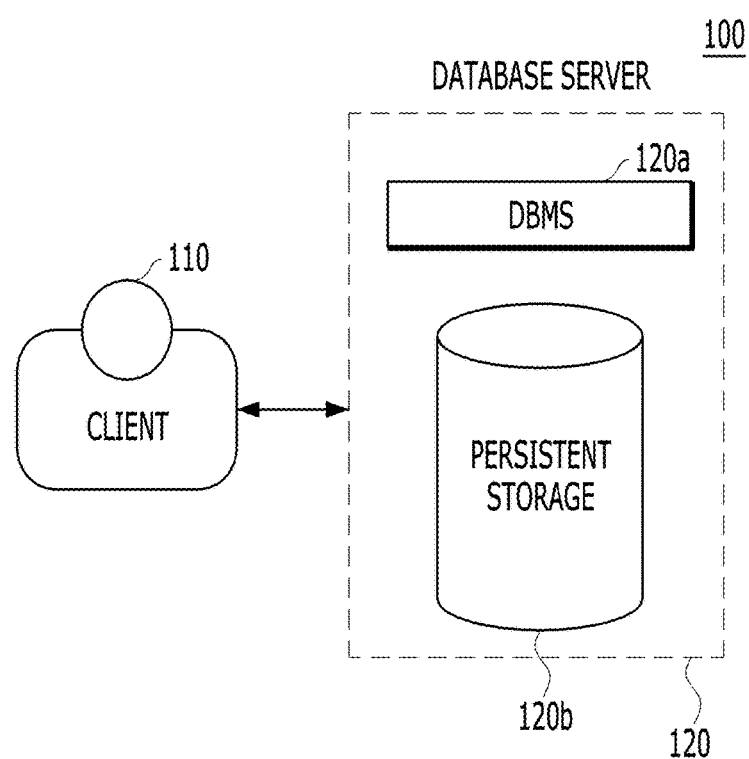
FIG. 1 is a schematic view of a database system according to an exemplary embodiment of the present disclosure.

Various embodiments and/or aspects are now disclosed with reference to drawings. In the following description, for description, multiple detailed matters are disclosed in order to help overall understanding of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some among various methods in principles of various aspects may be used and the descriptions are intended to include all of the aspects and equivalents thereof.

Various aspects and features will be presented by a system which can include multiple devices, components, and/or modules. It should also be appreciated and recognized that various systems can include additional devices, components, and/or modules and/or that the various systems cannot include all of devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of hardware and software, or software.

The term "or" is intended to mean not exclusive "or" but inclusive "or". That is, when not separately specified or not clear in terms of a context, the case where "X uses A or B" is intended to mean one of natural inclusive substitutions. That is, in the case where "X uses A or B" may be applied to either of the case where X uses A, the case where X uses B, or the case where X uses both A and B. Further, it should be understood that the term "and/or" used in the specification designate and include all available combinations of one or more items among enumerated related items.

The word "comprises" and/or "comprising" means that the corresponding feature and/or component is present, but it should be appreciated that presence or inclusion of one or more other features, components, and/or a group thereof is not excluded. Further, when not separately specified or not clear in terms of the context by indicating a singular form, it should be construed that the singular generally means "one or more" in the present specification and the claims.

The computer-readable medium in the present specification may include all kinds of storage media storing programs and data to be readable by the computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like and also include media implemented in the form of a carrier wave (for example, transmission through the Internet). Additionally, the media are distributed to systems connected through network modules to store computer readable codes and/or commands in a distribution scheme.

Prior to describing detailed contents for carrying out the present disclosure, it should be noted that configurations not directly associated with the technical gist of the present disclosure are omitted within the scope without departing from the technical gist of the present disclosure. Further, terms or words used in the present specification and claims should be interpreted as meanings and concepts which match the technical spirit of the present disclosure based on a principle to define appropriate concepts of the terms in order for an inventor to describe his/her disclosure by a best method.

FIG. 1 is a schematic view of a database system 100 according to an exemplary embodiment of the present disclosure.

As illustrated in FIG. 1, the database system 100 may include a client 110 and a database server 120.

As illustrated in FIG. 1, the client 110 may mean a node(s) in the database system having a mechanism for communication through a network. As illustrated in FIG. 1, the database system 100 may include a client 110 and a database server 120.

As illustrated in FIG. 1, the client 110 may mean a node(s) in the database system having a mechanism for communication through a network. For example, the client 110 may include a PC, a laptop computer, a workstation, a terminal, and/or a predetermined electronic device having network accessibility. Further, the client 110 may include a predetermined server implemented by at least one of an agent, an application programming interface (API), and a plug-in. For example, the client 110 in FIG. 1 may be related with a user who uses the database server 120 (e.g., database administration (DBA)). In this example, the client 110 may issue a query statement including a pivot operator to the database server 120.

The database server 120 may include, for example, a predetermined type of computer system or computing device such as a microprocessor, a main frame computer, a digital single processor, a portable device, and a device controller. The database server 120 may include a database management system (DBMS) 120a and a persistent storage 120b. Further, the database server 120 may be used to mutually exchange with a device for executing the query.

In FIG. 1, only one database server 120 is illustrated, but it will be apparent to those skilled in the art that more than one database server may also be included in the scope of the present disclosure and the database server 120 may include additional components. For example, although not illustrated in FIG. 1, the database server 120 may include one or more memories including a buffer cache. Further, although not illustrated in FIG. 1, the database server 120 may include one or more processors. Accordingly, the DBMS 120a may be operated by the processor on the memory.

In the present specification, the memory as a primary storage device which the processor directly accesses, such as a random access memory such as a dynamic random access memory (DRAM), a static random access memory (SRAM), or the like may mean a volatile storage device in which when power is turned off, stored information is instantaneously erased, but is not limited thereto. The memory may operate by the processor. The memory may temporarily store a data table including a data value. The data table may include the data value and in an exemplary embodiment of the present disclosure, the data value of the data table may be recorded in the persistent storage from the memory. In an additional aspect, the memory may include the buffer cache and data may be stored in a data block of the buffer cache. The data stored in the buffer cache may be recorded in the persistent storage by a background processor.

The persistent storage 120b means, for example, a non-volatile storage medium which continuously store predetermined data, such as storage devices based on a flash memory and/or battery-backup memory in addition to a magnetic disk, an optical disk, and a magneto-optical storage device. The persistent storage 120b may communicate with the processors and memories of the database server 120 through various communication means. In an additional exemplary embodiment, the persistent storage 120b is positioned outside the database server 120 to communicate with the database server 120.

The DBMS 120a as a program for permitting the database server 120 to perform operations such as searching, inserting, modifying, and/or deleting required data may be implemented by the processor in the memory of the database server 120 as described above.

The client 110 and the database server 120 or the database servers may communicate with each other through a network (not illustrated). A network according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may adopt various wireless communication systems including code division multiple access (CDMA), time division multiple access (TDMA), frequency division multiple access (FDMA), orthogonal frequency division multiple access (OFDMA), single carrier-FDMA (SC-FDMA), and other systems. For example, the network may include a database link (dblink), and as a result, a plurality of database servers communicates with each other through the database link to bring data from another database server. The technologies described in the present specification may be used in other networks as well as the mentioned networks.

As described above, when the pivot operation is performed in the database, additional multiplepivot columns are generated as a result of the pivot operation. As a result, there is inconvenience that the user needs to perform complicated SQL modification in order to perform an additional operation by using the additional multiple pivot columns. According to a technique according to the exemplary embodiment of the present disclosure, since a pivot execution result is generated in a table form (e.g., one or more pivot columns) and serialized in the BLOB type, the serialized BLOB data may be stored in a single pivot column. Therefore, since a result table of executing the pivot operation may be expressed in the single pivot column, the user may conveniently manage the pivot columns. Additionally, the exemplary embodiment of the present disclosure may include a technique that stores the execution result of the pivot operation in a form of pivot BLOB and a technique that analyzes, queries, and outputs the pivot BLOB.

An "original table" which is a term used in the present specification may mean a table storing data which becomes a basis in generating the BLOB data as the execution result of the pivot operation. Moreover, a "pivot table" which is a term used in the present specification may mean a table storing the BLOB data generated as the execution result of the pivot operation. Further, a "pivot column" in the present specification may mean a column including the pivot BLOB which is present in the pivot table. In addition, "pivot BLOB" which is a term used in the present specification may mean a structure in which the result of the table-form pivot operation is serialized and stored. Moreover, herein, "serialization" may mean, for example, converting or arranging a complex object such as the table into data of consecutive streams such as a binary number or a hexadecimal number. Further, herein, a "client" may be interchangeably used with the user or "DBA". In addition, herein, a "query statement" and an "SQL statement" may be used interchangeably.

Execution of the pivot operation disclosed in the present specification may mean, for example, exchanging a row and a column after executing an aggregation operation.

As shown in Table 1 given below, a first column C1 may include rows including a value for one of ITEM1 to ITEM3 and a second column C2 may include rows including a value for CARROT or BANANA.

TABLE 1

| C1 | C2 |
|---|---|
| ITEM1 | CARROT |
| ITEM2 | CARROT |
| ITEM2 | BANANA |
| ITEM3 | CARROT |
| ITEM3 | CARROT |
| ITEM3 | BANANA |

When the pivot operation for the original table (e.g., a table before executing the pivot operation) including the first column C1 and the second column C2 shown in Table 1 is performed, a table having a form shown in Table 2 given below may be generated.

TABLE 2

| C1 | CARROT | BANANA |
|---|---|---|
| ITEM1 | 1 | |
| ITEM2 | 1 | 1 |
| ITEM3 | 2 | 1 |

As shown in Table 2, when the pivot operation (associated with the second column C2) for the table of Table 1 is executed, an implicit Group by operation may be executed with respect to the first column C1 and the aggregation operation may be executed with respect to the second column C2 and thereafter, the row and the column may exchange with each other.

TABLE 3

| C1 | Pivot_Col |
|---|---|
| ITEM1 | [1,] |
| ITEM2 | [1, 1] |
| ITEM3 | [2, 1] |

Table 3 shows an example of storing the result (Table 2) of the pivot operation for the table shown in Table 1 in one column.

As shown in Table 3, values for a CARROT column and a BANANA column in Table 2 may be stored in the table form of the single column called the pivot column Pivot_Col. Since the BLOB type data may be stored in each row of the single column called the pivot column as described below, the result of the pivot operation may be stored only in one column even though the pivot operation is executed. Therefore, the user may conveniently manage columns of which the pivot operation is executed. In the present specification, for easy description, only an example in which only the single pivot column is included in one pivot table is described as an example, but a case in which a plurality of pivot columns of one pivot table is included may also be included in the scope of the present disclosure.

Figure 2:
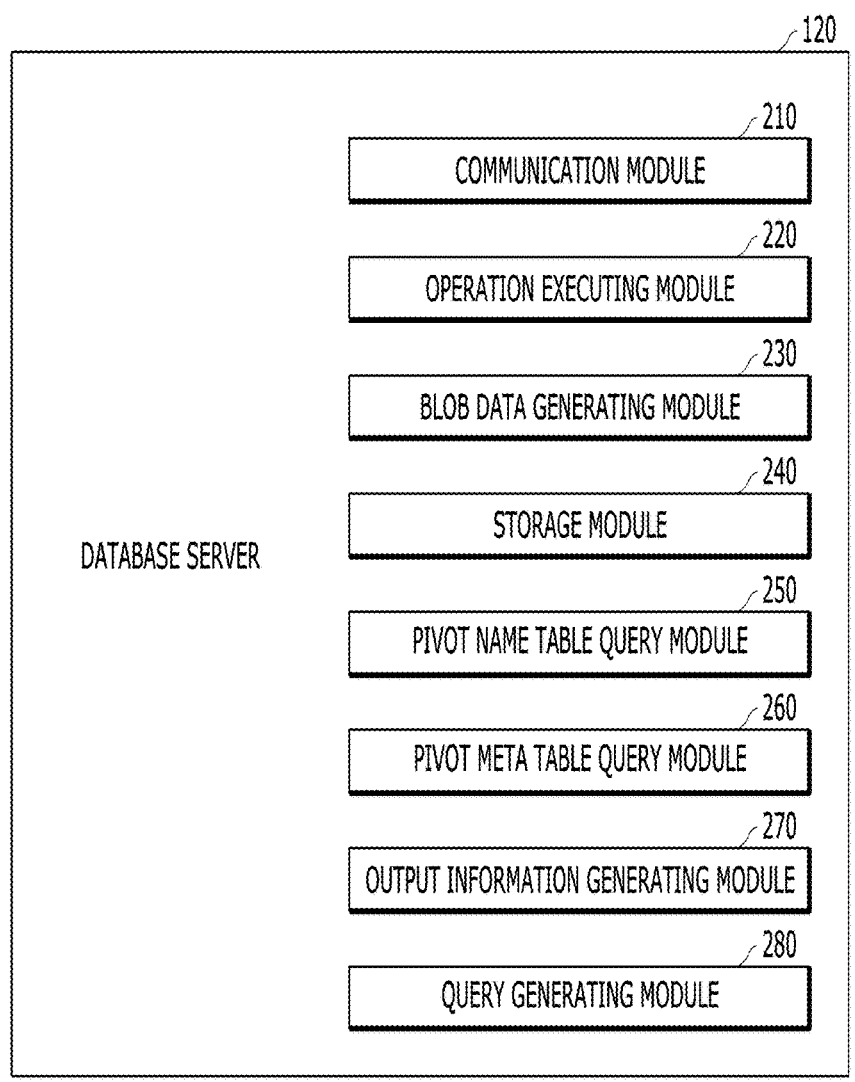
FIG. 2 is a schematic view of a database server according to an exemplary embodiment of the present disclosure.

FIG. 2 is a schematic view of a database server 120 according to an exemplary embodiment of the present disclosure.

As illustrated in FIG. 2, the database server 120 may include a communication module 210, an operation executing module 220, a BLOB data generating module 230, a storage module 240, a pivot name table query module 250, a pivot meta table query module 260, an output information generating module 270, and a query generating module 280. The components of the database server 120 illustrated in FIG. 2 are exemplary and predetermined components associated with an operation of the database server 120 may be added or some of the components may be omitted.

In an exemplary embodiment of the present disclosure, the communication module 210 may provide a communication function with the client 110 or another database server to the database server 120. For example, the communication module 210 may communicate with another database server or the client 110 by using the aforementioned predetermined network and/or database link. In addition, the communication module 210 may receive predetermine requests such as data storage, query and index build, a query request, and the like from the client 110 using the database server 120. Besides, the communication module 210 may transfer result information for the predetermined requests such as the data storage, query and index build, and the query request to the client 110 or another database server. Moreover, the communication module 210 may communicate with another database server by a method which calls a procedure to the other database server.

In an exemplary embodiment of the present disclosure, the communication module 210 may receive a query statement including a pivot operator. As one example, the pivot operator may include an operator which intends to store a result of executing the pivot operation as BLOB type data. As one example, the pivot operator may include a "PIVOT BLOB" operator. The received query statement may be associated with an original table. For example, the query statement may include an expression that a result for the pivot operation executed with respect to data stored in the original table is stored as a BLOB type. The query statement may include an expression designating that the pivot operation will be executed with respect to at least some columns in the original table. The original table may include a first set of column(s) which is (are) not associated with the pivot operator and a second set of column(s) which is (are) associated with the pivot operator.

In an exemplary embodiment of the present disclosure, the communication module 210 may receive the query statement for requesting the BLOB data serialized and stored in the pivot column of the pivot table as the BLOB type. The communication module 210 may receive a pivot table query request and/or a pivot table output request from the client 110. Further, the communication module 210 may transfer result values (e.g., output information, and the like) which respond to a request from the client 110 to the corresponding client 110. In addition, the query statement received by the communication module 210 may include hint information expressing a column associated with the pivot input from DBA.

The operation executing module 220 may perform a predetermined database operation corresponding to the query statement in response to reception of the query statement. For example, the operation executing module 220 may execute the pivot operation for the original table. The execution of the pivot operation may include executing a Group by operation with respect to one or more first sets of columns not associated with the pivot operator in the original table, executing an aggregation operation by the unit of the first set of one or more columns of which the Group by operation is performed with respect to one or more second sets of columns associated with the pivot operator in the original table by the unit of one or more first sets of columns of which the Group by operation is executed and thereafter, exchanging rows and columns for one or more second sets of columns with each other.

The operation executing module 220 may generate a buffer table. Further, the operation executing module 220 may execute a predetermined database operation generated in generating the output information for the BLOB data.

The BLOB data generating module 230 serializes at least a part of the execution result of the pivot operation to the BLOB type to generate the BLOB data. The BLOB data generating module 230 serializes the execution result of the pivot operation for the second set of column(s) associated with the pivot operator to the BLOB type in the original table to generate the BLOB data.

The storage module 240 may store predetermined data stored in association with task execution of the database server 120. For example, the storage module 240 may be configured to store the generated BLOB data in the pivot table. The storage module 240 may be included in the DBMS 120a and/or the persistent storage 120b. Additionally, the storage module 240 may generate the original table and/or the pivot table in the database server 120. As another example, the tables may be generated by a separate component such as a control module (not illustrated). Further, the storage module 240 may process and manage a request associated with storage (including update) of data. The storage module 240 may decide to store predetermined data in the data table and an index table. Further, the storage module 240 may decide a storage position for the table. For example, the storage module 240 may decide a storage position of data on the table. As another example, the storage module 240 may decide a storage position of data on the persistent storage 120b.

In the exemplary embodiment of the present disclosure, the storage module 240 may store the generated BLOB data in a second pivot column (that is, a pivot BLOB column) in the pivot table. Herein, the second pivot column may mean the single column. Further, the storage module 240 may store the execution result of the pivot operation for a first set of one or more columns which do not correspond to the pivot operator in the original table in the first pivot column in the pivot table as a non-BLOB type. Herein, the first pivot column and the second pivot column may mean different columns. Further, the storage module 240 may store the generated BLOB data in the pivot table and thereafter, store meta information for the generated BLOB data in a meta information management table (a pivot name table and a pivot meta table).

In FIG. 2, a pivot name table query module 250 and a pivot meta table query module 260 are illustrated. The BLOB data in which the result of the pivot operation is serialized may include data information and positional information for respective columns constituting a table expressed by the BLOB data. In order to generate more accurate output information for the BLOB data, a pivot name table for storing name information for the respective columns and a pivot meta table for keeping accurate generation information for a table read from the BLOB data may be present. The pivot name table and the pivot meta table as tables separate from the original table and the pivot table may include the aforementioned meta information and following meta information.

In the exemplary embodiment of the present invention, the pivot name table may have an exemplary structure shown in Table 4 given below.

TABLE 4

| Column name | Type |
| --- | --- |
| SGMT_ID | NUMBER |
| COL_ID | NUMBER |
| IDX | NUMBER |
| NAME | VARCHAR(4000) |

As shown in Table 4, the pivot name table may be used to determine name information for one or more columns generated as the result of the pivot operation included in the respective pivot columns of the pivot table. The pivot name table may have a segment ID (SGMT_ID) identifying an ID for the pivot table, a column ID (COL_ID) identifying the pivot column storing the BLOB data in the pivot table, and a column name of an index (IDX) identifying the column of the table expressed by the BLOB data in the pivot table. Further, the pivot meta table may include NAME representing the column name of an IDX column of the table expressed by the BLOB data in the pivot column.

In the exemplary embodiment of the present disclosure, the pivot meta table may have an exemplary structure shown in Table 5 given below.

TABLE 5

| Column name | Type |
| --- | --- |
| SGMT_ID | NUMBER |
| COL_ID | NUMBER |
| IDX | NUMBER |
| TYPE | NUMBER |
| AGGR_NAME | VARCHAR(4000) |

As shown in Table 5, the pivot meta table may have a column name of TYPE for identifying an internal storage form for the BLOB data stored as the result of the pivot operation. For example, the internal storage form may include NUMBER representing a number, CHARACTER representing a character, and VARCHAR( ) representing a variable-length character string. Herein, VARCHAR(4000) may mean a variable-length character string of a maximum of 4000 bytes. Further, the pivot meta table may have the segment ID (SGMT_ID) identifying the ID for the pivot table, the column ID (COL_ID) identifying the pivot column storing the BLOB data in the pivot table, and the column name of the index (IDX) identifying the column of the table expressed by the BLOB data in the pivot table. In addition, the pivot meta table may include AGGR_NAME for storing a rule by which the column names for the respective columns of the table stored in the corresponding pivot BLOB are made.

In an additional exemplary embodiment, the pivot name table and the pivot meta table may have a mapping relationship with the pivot table associated therewith or a table showing a separate mapping relationship may be present. It should be noted that values stored in the tables shown in Tables 4 and 5 are exemplary.

Referring back to FIG. 2, the pivot name table query module 250 queries the pivot name table for the pivot table to determine name information for one or more columns generated as the result of the pivot operation, which are included in the respective pivot columns of the pivot table. In addition, the pivot meta table query module 260 queries the pivot meta table for the pivot table to determine internal storage type information of the pivot table. Herein, the internal storage type information may mean, for example, information for identifying the internal storage form for the BLOB data stored as the result of the pivot operation.

In the exemplary embodiment of the present disclosure, the output information generating module 270 may generate the output information for the BLOB data corresponding to the query statement based on the determined name information and internal storage type information. The output information generating module 270 may perform an operation of analyzing a value of the BLOB data stored in the pivot column of the pivot table based on the determined internal storage type information and name information, an operation of generating a buffer table based on the analyzed value, an operation of automatically generating the SQL statement for querying the generated buffer table, and an operation of generating the output information for the BLOB data by executing an operation depending on the automatically generated SQL statement.

In the exemplary embodiment of the present disclosure, the query generating module 280 may automatically generate the SQL statement for querying the pivot name table and pivot meta table generated based on the value when the value for the BLOB data is analyzed. Although the DBA issues the SQL statement including only the query/output request for a specific table or a specific column, a sub query statement for querying the pivot name table and the pivot meta table may be automatically generated by the query generating module 280. That is, the query generating module 280 determines whether the received query statement includes hint information and when it is determined that the received query statement includes the hint information, the query generating module 280 may automatically generate each of two sub query statements for the received query statement. Herein, two sub query statements may mean a sub query statement for querying the pivot name table and a sub query statement for querying the pivot name table. In the exemplary embodiment of the present disclosure, the query generating module 280 may automatically generate the SQL statement (internal SQL) for querying the generated buffer table based on the value when the value for the BLOB data is analyzed.

Additionally, the query generating module 280 may generate the internal SQL statement for storing the generated BLOB data in the pivot table and thereafter, storing the meta information for the generated BLOB data in a meta information management table (e.g., the pivot name table and the pivot meta table).

Figure 3:
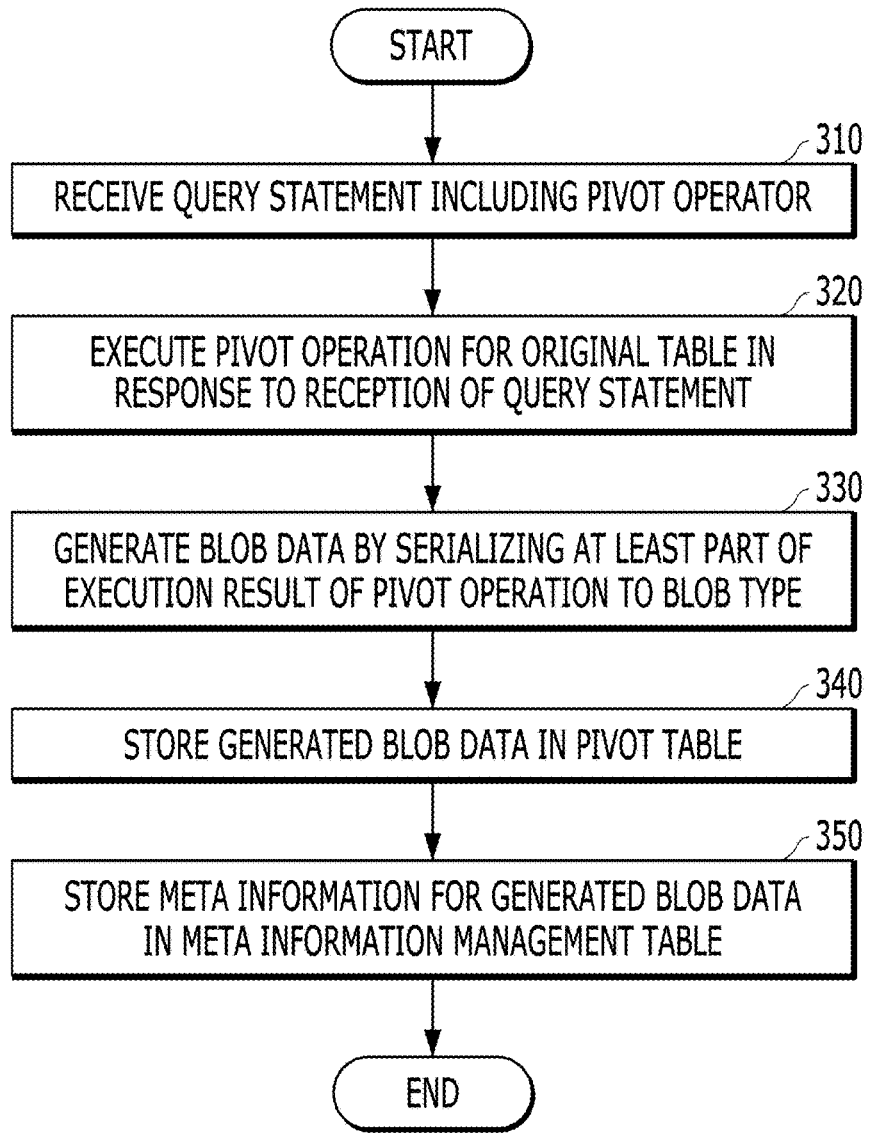
FIG. 3 is a flowchart of a method for executing a query according to an exemplary embodiment of the present disclosure.

FIG. 3 is a flowchart of a method for executing a query according to an exemplary embodiment of the present disclosure. Steps illustrated in FIG. 3 may be performed by, for example, the database server 120. The steps illustrated in FIG. 3 are exemplary and additional steps may be included or at least some steps may be omitted.

As illustrated in FIG. 3, the database server 120 may receive the query statement including the pivot operator from the client 110 (310). In the exemplary embodiment of the present disclosure, the query statement may include a hint input from the client 110. For example, the hint may include information representing that a specific table represented by the query statement or a specific column of the table is a pivot BLOB column.

Then, the database server 120 may perform the pivot operation for the original table in response to the reception of the query statement (320). That is, the database server 120 may perform a database operation corresponding to the received query statement. For example, the executing of the pivot operation in step 320 may include executing a Group by operation with respect to the first set of one or more columns not associated with the pivot operator in the original table, executing an aggregation operation with respect to one or more second sets of columns associated with the pivot operator in the original table by the unit of one or more first sets of columns of which the Group by operation is executed and thereafter, exchanging rows and columns for one or more second sets of columns with each other.

The database server 120 serializes at least a part of the execution result of the pivot operation to the BLOB type to generate the BLOB data (330). The operation of generating the BLOB data may include an operation of generating the BLOB data by serializing the execution result of the pivot operation for the second set of one or more columns associated with the pivot operator in the original table to the BLOB type.

The generated BLOB data may include header count BLOB data representing the number of columns having no null value as the result of the pivot operation for the second set of one or more columns associated with the pivot operator in the original table, header BLOB data representing header information for the respective columns having no null value, and value BLOB data representing actual values for the respective columns having no null value. The BLOB data may be constituted (that is, serialized) by the header count BLOB data, the header BLOB data, and the value BLOB data in order.

In more detail, the header information of the header BLOB data may include, for example, column number information having a size of 4 bytes and offset information in BLOB data having the size of 4 bytes. The offset information may represent actual positional information on the BLOB data for a value of a column corresponding to the column number information. Further, the header count BLOB data may have, for example, the size of 4 bytes. The header BLOB data may have, for example, a size obtained by multiplying the number of columns having no null value by 8 bytes.

In other words, the BLOB data has a header part in a head part as metadata. The metadata may be constituted by a 4-byte header count meaning the number of columns having no null value of the table in the BLOB data and as many 8-byte headers as the header counts. The respective headers may have one column information of the table in one BLOB data and may be constituted by a 4-byte column number and an offset representing a location in the BLOB data. An actual data value of the corresponding column may be disposed according to the offset in the order of headers recorded subsequently thereto.

Referring back to FIG. 3, the database server 120 may store the generated BLOB data in the pivot table (340). In more detail, the database server 120 may store the generated BLOB data in the second pivot column (that is, the pivot BLOB column) as the single column in the pivot table. Further, the database server 120 may store the execution result of the pivot operation for the column(s) not associated with the pivot operator in a column(s) different from the second pivot column as the non-BLOB type.

The database server 120 may store the meta information for the generated BLOB data in the meta information management table (e.g., the pivot name table and the pivot meta table) (350). In more detail, the database server 120 executes the internal SQL by generating the internal SQL such as INSERT_INTO SYS.PV_NAME VALUES (~~~~) and INSERT_INTO SYS.PV_META VALUES (~~~~) to store (add) the meta information for the BLOB data in(to) the pivot name table and the pivot meta table.

In the exemplary embodiment of the present disclosure, the BLOB data stored in the pivot table may be exemplarily described as follows. The SQL statement to be described below is exemplary for describing the present disclosure and it should be noted that the scope of the present disclosure is not limited to the following SQL statement.

The SQL statement including an expression of create table orig_tbl (c1 varchar2(10), c2 varchar2(10), c3 number) may be received. As a result, the original table having columns of c1, c2, and c3 may be generated. Herein, varchar2(100) as a variable data type may designate an expression indicating that up to a maximum of 100 bytes is available. Further, number may designate a data type number of the corresponding column. In addition, the SQL statement including an expression of create table pivot_tbl (c1 varchar2(10), c2 blob) may be received. Herein, pivot_tbl may mean the pivot table, and as a result, the pivot table including two columns (that is, a c1 column as varchar2(10) and a c2 column of a blob type) may be generated.

For example, it is assumed that the original table shown in Table 6 given below is present.

TABLE 6

| C1 (varchar2(10)) | C2 (varchar2(10)) | C3 number |
|---|---|---|
| ITEM1 | RED | 10 |
| ITEM1 | YELLOW | 20 |
| ITEM1 | GREEN | 30 |
| ITEM1 | RED | 10 |
| ITEM1 | YELLOW | 20 |
| ITEM1 | GREEN | 30 |
| ITEM2 | RED | 10 |
| ITEM2 | GREEN | 30 |

In this case, the result of executing the pivot operation according to the SQL statement may be stored in the pivot table as the BLOB type.

```
INSERT /*+ APPEND */ INTO PIVOT_TBL
SELECT /*+ PIVOT_COL(PIVOT1 2) */ c1, pivot_col
FROM (
    SELECT c1, pivot_col
    FROM
    (
        SELECT c1, c2, c3 FROM ORIG_TBL
    )
    PIVOT BLOB (sum(c3) AS ""%_COL"" FOR (c2))
) PIVOT1
```

Herein, an expression disclosed as /*+ or */ may mean an annotation type hint expression designated by the DBA. For example, an expressions /*+ APPEND */ may mean a hint indicating that the corresponding data is immediately inserted in a table space without stacking rollback in order to easily perform mass data processing. For example, an expression /*+ PIVOT_COL(PIVOT1 2) */ may mean a hint indicating that a table PIVOT1 or a second column of a query intermediate result value is the pivot column. According to the SQL statement, the sum of c3 values for rows of a c2 column among c1, c2, and c3 columns of the original table may be stored in the pivot column of the pivot table as the BLOB type. That is, when a PIVOT BLOB operator is included in the SQL, the database server may perform the pivot operation for the original table and thereafter, store the execution result of the pivot operation in the (single) column of the pivot table as the BLOB type based on the corresponding SQL statement.

TABLE 7

| C1 (varchar2(10)) | C2 BLOB |
|---|---|
| ITEM1 | 000000030000 . . . |
| ITEM2 | 000000020000 . . . |

Table 7 shows the pivot table after the pivot operation is executed by executing the SQL statement in the original table of Table 6. Herein, the result of the pivot operation may be stored in one column, a C2 BLOB column. For example, in a first row of the C2 BLOB column, data (that is, data indicating 'RED': 20, 'YELLOW': 40, 'GREEN': 60) called [60(0), 20(1), 40(2)] may be stored in the BLOB type. For example, a second row of the C2 BLOB column, data (that is, data indicating 'RED': 10 and 'GREEN': 30) called [30(0), 10(1)] may be stored in the BLOB type. The BLOB type data may express a byte as a hexadecimal number.

Figure 4:
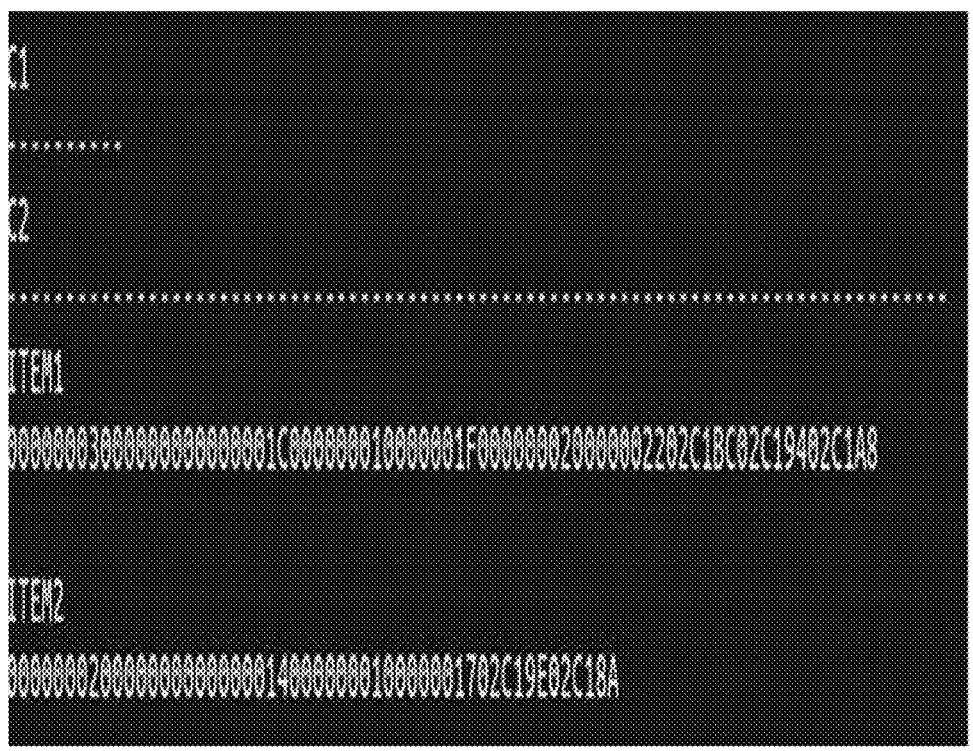
FIG. 4 exemplarily illustrates BLOB data stored in a pivot table according to an exemplary embodiment of the present disclosure.

FIG. 4 exemplarily illustrates BLOB data stored in a pivot table according to an exemplary embodiment of the present disclosure.

As illustrated in FIG. 4, the pivot column for ITEM2 may include data (that is, data indicating 'RED': 10 and 'GREEN': 30) called [30(0), 10(1)]. 00 00 00 02 which are the first four bytes of the BLOB data of the corresponding pivot column may express a total of two columns having no null. This may express the header count (hdr_count).

Each of the two non-null columns may have a header value of 8 bytes. The header value of 8 bytes may be arranged after the first four bytes. The header value may express a column number value of 4 bytes and an offset value in a BLOB of 4 bytes. That is, 00 00 00 00 after the first four bytes may express a number value for a 0-th column and 00 00 00 14 which is subsequent thereafter may express the offset value (that is, the offset is 20 and this indicates that an actual value for the 0-th column is included in a byte from a first byte by 20 bytes for the 0-th column value. 00 00 00 01 which is subsequent thereafter may express the number value for the first column and 00 00 00 17 which is subsequent thereafter may express the offset value (that is, the offset is 23) for the first column.

02 C1 9E which is subsequent thereafter may express the actual value (that is, 30) for the 0-th column and 02 C1 8A may express the actual value (that is, 10) for the first column. Herein, a first 1 byte (02) in a byte stream expressing the actual value may be configured to express a length for a value indicating that 2 bytes thereafter expresses the actual value.

Description of the BLOB data configuration is exemplary and various types of byte stream configurations may also be included in the scope of the present disclosure.

Figure 5:
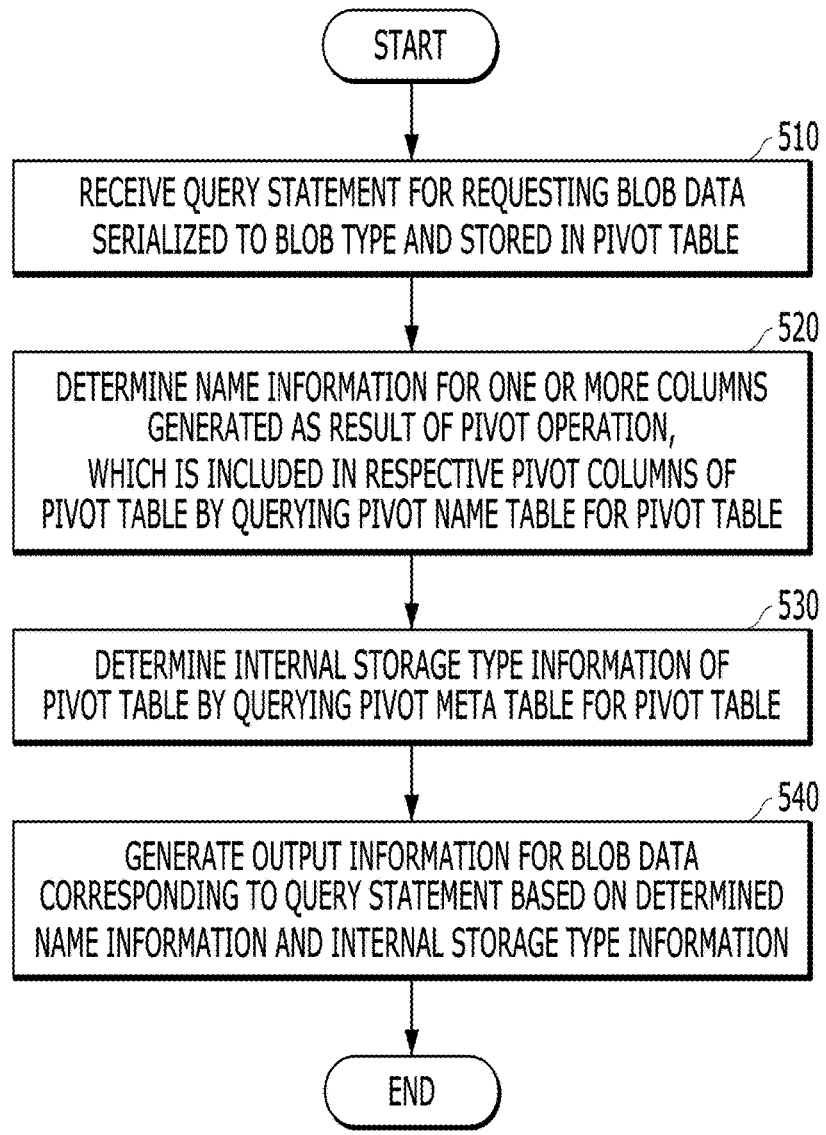
FIG. 5 is a flowchart of a method for executing a query according to an exemplary embodiment of the present disclosure.

FIG. 5 is a flowchart of a method for executing a query according to an exemplary embodiment of the present disclosure. Steps illustrated in FIG. 5 may be performed, by for example, the database server 120. The steps illustrated in FIG. 5 are exemplary and additional steps may be included or at least some steps may be omitted.

The database server 120 may receive the query statement for requesting the BLOB data serialized to the BLOB type and stored in the pivot table (510). In the exemplary embodiment of the present disclosure, the query statement may mean a query for querying and/or outputting the BLOB data.

The received query statement may include hint information expressing a column associated with the pivot input from DBA. When the hint information is received, the database server 120 (e.g., the operation executing module) may determine that the table or column associated with the query stores the BLOB data depending on the pivot operation based on the hint information and perform processing therefor. Therefore, when the hint information is received, even though a value stored in the corresponding column has the byte stream form, the database server 120 may determine the stored value as not the simple byte stream form but the byte stream form representing the BLOB data. Therefore, the database server 120 may generate not the output information illustrated in FIG. 4 but the output information illustrated in FIG. 8 and transfer the generated output information to the DBA.

The database server 120 (e.g., the query generating module 280) may determine whether the received query statement includes the hint information. When the database server 120 determines that the query statement includes the hint information, each of two sub query statements for the received query statement may be automatically generated. Herein, the two sub query statements may mean a subquery statement for querying the pivot name table and a subquery statement for querying the pivot meta table.

Then, the database server 120 may determine name information for one or more columns generated as the result of the pivot operation included in the respective pivot columns of the pivot table by querying the pivot name table for the pivot table (S520). As the database server 120 queries the pivot name table, information on the table including the pivot column, information indicating in which column in the corresponding table the BLOB data is present, information indicating the BLOB data, and name information for the column(s) in the table stored in each pivot column may be obtained.

Then, the database server 120 queries the pivot meta table for the pivot table to determine internal storage type information of the pivot table. When the database server 120 queries the pivot meta table, the database server 120 may obtain information on a type of data stored in the pivot column or the pivot table.

Then, the database server 120 may generate the output information for the BLOB data corresponding to the query statement based on the determined name information and internal storage type information (540). In more detail, the database server 120 may analyze a value of the BLOB data stored in the pivot column of the pivot table based on the determined internal storage type information and name information, generate a buffer table based on the analyzed value, automatically generate the SQL statement for querying the generated buffer table, and generate the output information for the BLOB data by executing an operation depending on the automatically generated SQL statement.

FIG. 6 illustrates an exemplary query result screen for a pivot name table according to an exemplary embodiment of the present disclosure.

In the exemplary embodiment of the present disclosure, when the database server 120 receives the query statement from the client 110 and when it is determined that the corresponding query statement is associated with the pivot table (alternatively, the pivot column) storing the BLOB data, the database server 120 may generate the sub query for querying the pivot name table called, for example, select * from sys.pv_name. In an additional exemplary embodiment of the present disclosure, when the database server 120 receives the query statement from the client 110 and when the database server 120 discovers the column storing the BLOB data in processing the corresponding query statement, the database server 120 may generate the sub query for querying the pivot name table. In an additional exemplary embodiment of the present disclosure, when the database server 120 receives the query statement from the client and when the database server 120 discovers the column storing the BLOB data in processing the corresponding query statement, the database server 120 may generate information querying whether to inquire the pivot name table to the client 110 because the column storing the BLOB data is discovered. In an additional exemplary embodiment of the present disclosure, the corresponding pivot name table may be inquired according to the query statement generated from the client 110.

The pivot name table may be inquired and output through the corresponding sub query generated by the database server 120 as illustrated in FIG. 6. The output information for the pivot name table, which is illustrated in FIG. 6 represents that values having names of GREEN_COL, RED_COL, and YELLOW_COL in a pivot column having an identification number of 1 in a pivot table having an identification number of 1970 are stored as the BLOB type.

FIG. 7 illustrates an exemplary query result screen for a pivot meta table according to an exemplary embodiment of the present disclosure.

In the exemplary embodiment of the present disclosure, when the database server 120 receives the query statement from the client 110 and when it is determined that the corresponding query statement is associated with the pivot table (alternatively, the pivot column) storing the BLOB data, the database server 120 may generate the sub query for querying the pivot meta table called, for example, select * from sys.pv_meta. In more detail, for example, the sub query may be generated, which is used for querying the pivot name table and the pivot meta table of a type such as select name from pv_name where sgmt_id=?? and col_id=?? order by idx, select type, aggr_name from pv_meta where sgmt_id=?? and col_id=?? order by idx.

In an additional exemplary embodiment of the present disclosure, when the database server 120 receives the query statement from the client 110 and when the database server 120 discovers the column storing the BLOB data in processing the corresponding query statement, the database server 120 may generate the sub query for querying the pivot meta table. In an additional exemplary embodiment of the present disclosure, when the database server 120 receives the query statement from the client and when the database server 120 discovers the column storing the BLOB data in processing the corresponding query statement, the database server 120 may generate information querying whether to inquire the pivot meta table to the client 110 because the column storing the BLOB data is discovered. In an additional exemplary embodiment of the present disclosure, the corresponding pivot meta table may be inquired according to the query statement generated from the client 110.

The pivot meta table may be queried and output through the corresponding sub query generated by the database server 120 as illustrated in FIG. 7. The output information for the pivot meta table, which is illustrated in FIG. 7 represents that a value of column #0 of the table, which is stored in the BLOB data stored in the pivot column having the identification number of 1 in the pivot table having an identification number of 1970 expresses a type (e.g., a number) having the identification number of 1.

FIG. 8 illustrates exemplary output information for BLOB data stored according to an exemplary embodiment of the present disclosure.

The output information of the type illustrated in FIG. 4, which is described above may be generated according to the query statement called, for example, select c1, c2 from PIVOT_TBL. That is, since the output information in FIG. 4 does not include the hint information in the query statement received from the client 110, the BLOB data may be just output in the byte stream form.

The query statement received from the client 110 may be, for example, select /*+ PIVOT_COL(PIVOT_TBL) */ c1, c2 from PIVOT_TBL. As shown in an expression of /*+ PIVOT_COL(PIVOT_TBL) */, since the corresponding table or column includes the hint information called the pivot table or the pivot column, the database server 120 may generate the output information illustrated in FIG. 8. The hint information in the present specification is not limited only to the /*+ */ expression and various types of hint information may be included.

As illustrated in FIG. 8, values of pivot columns of the pivot table may be displayed as not the BLOB type but the table type (e.g., in the case of ITEM 1, [60.0(0), 20.0(1), 40.0(2)]). Further, the values of ITEM1 may correspond to GREEN_COL(0), RED_COL(1), and YELLOW_COL(2), respectively in order.

Figure 9:
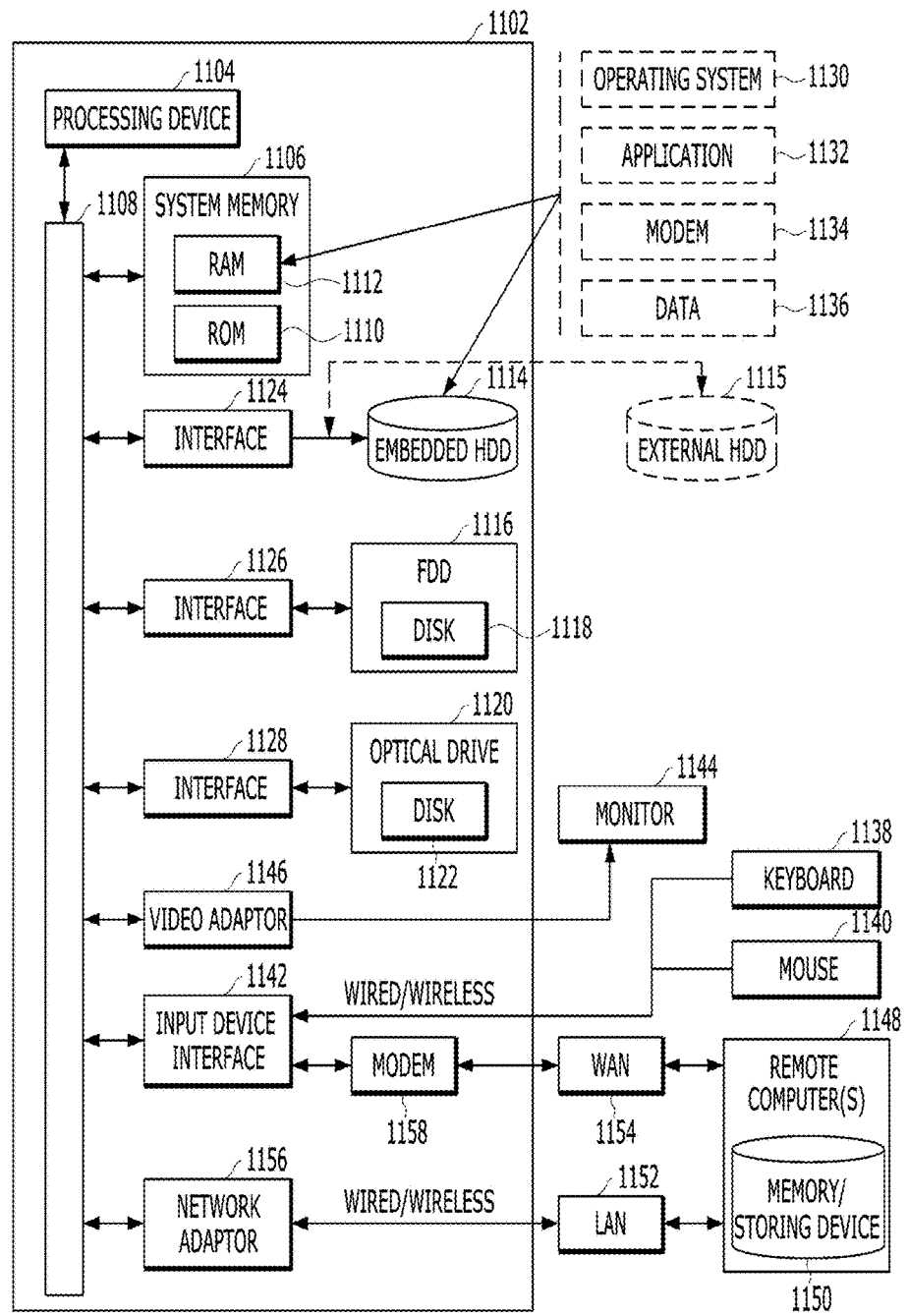
FIG. 9 is a simple and general schematic view of an exemplary computing environment of a database server or device in which exemplary embodiments of the present disclosure can be implemented.

FIG. 9 is a simple and general schematic view of an exemplary computing environment of a database server or device in which exemplary embodiments of the present disclosure can be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable medium may include both a computer storage medium and a communication medium. The computer storage medium includes volatile and non-volatile, temporary or non-temporary, movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing at least one of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in a range of the computer readable media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting.

The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as an Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication server on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes Wi-Fi and a Bluetooth wireless technology. Accordingly, communication may be a predefined structure like the network in the related art or just ad hoc communication between at least two devices.

Wireless fidelity (Wi-Fi) enables connection to the Internet, and the like without a wired cable. Wi-Fi is a wireless technology such as a device, for example a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. Wi-Fi may be used to connect computers to each other or the Internet and a wired network (using IEEE 802.3 or Ethernet). The Wi-Fi network may operate, for example, at a data rate of 11 Mbps(802.11a) or 54 Mbps(802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, posses, and/or transfer command(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

What is claimed is:

1. A non-transitory computer-readable medium including encoded commands, wherein the commands are executed by one or more processors of a computing system, where the one or more processors cause operations for executing a query statement in a database management system (DBMS), the operations including:
   an operation of receiving a query statement for requesting BLOB data serialized to a binary large object (BLOB) type and stored in a pivot table, wherein the pivot table includes the BLOB data at a place where a pivoted data set is to be stored, in lieu of the pivoted data set so that the BLOB data functions as the pivoted data set;
   an operation of determining whether the received query statement is associated with the pivot table in response to finding the pivot table in which the BLOB data is stored, by analyzing the received query statement;
   an operation of automatically generating a first subquery statement for querying a pivot name table including at least pivot column name information and a second subquery statement for querying a pivot meta table including at least internal storage type information of the pivot table, in response to determining that the received query statement is associated with the pivot table;

an operation of determining name information for one or more columns generated as a result of a pivot operation included in respective pivot columns of the pivot table by querying a pivot name table for the pivot table based on the generated first subquery statement;

an operation of determining internal storage type information of the pivot table by querying a pivot meta table for the pivot table based on the generated second subquery statement; and an operation of generating output information for the BLOB data corresponding to the query statement based on the determined name information and the determined internal storage type information.

2. The computer program of claim 1, wherein the received query statement includes hint information expressing a column associated with a pivot input from database administration (DBA).

3. The computer program of claim 1, wherein the operation of generating the output information for the BLOB data includes:
an operation of analyzing a value of the BLOB data stored in the pivot column of the pivot table based on the determined internal storage type information and name information;
an operation of generating a buffer table based on the analyzed value;
an operation of automatically generating a SQL statement in order to query the generated buffer table; and
an operation of generating the output information for the BLOB data by performing an operation depending on the automatically generated SQL statement.

4. The computer program of claim 1, wherein the pivot name table further includes:
a segment ID identifying an ID for the pivot table;
a column ID identifying the pivot column storing the BLOB data in the pivot table; and
an index identifying a column number of a table expressed by the BLOB data in the pivot column in the pivot table.

5. The computer program of claim 1, wherein the internal storage type information identifies an internal storage form for the BLOB data stored as a result of the pivot operation.

6. The computer program of claim 5, wherein the pivot meta table further includes:
a segment ID identifying an ID for the pivot table;
a column ID identifying the pivot column storing the BLOB data in the pivot table; and
an index identifying a column number of a table expressed by the BLOB data in the pivot column in the pivot table.

7. The computer program of claim 1, wherein the BLOB data is stored in a single column in the pivot table in a manner that a result value of the pivot operation in the original table is serialized to the BLOB type.

8. The computer program of claim 1, wherein the output information for the BLOB data includes at least one of output information for the BLOB data of the serialized stream stored in the pivot table and output information expressing a table constituted by one or more columns generated as the result of the pivot operation, which is stored in the pivot table.

9. An apparatus for executing a query statement in a database management system, the apparatus comprising:
a database management module in the database management system, where the database management module is configured to cooperate with components in the database management system that include one or more processors to execute instructions, one or more memories to store information, one or more data input components to receive data input from a user of the database management system, a communication circuit to establish a communication link to communicate with other computing devices external to the database management system, a display device to display at least some of the information stored in the one or more memories, where portions of the database management module implemented in software are stored in the one or more memories and are executed by the one or more processors, where the database management module consists of multiple different modules including but not limited to a communication module, a query generating module, a pivot name table query module, a pivot meta table query module, and an output information generating module;

where the communication module is configured to receive a query statement for requesting BLOB data serialized to a binary large object (BLOB) type and stored in a pivot table, wherein the pivot table include the BLOB data at a place where a pivoted data set is to be stored, in lieu of the pivoted data set so that the BLOB data functions as the pivoted data set;

where the query generating module is configured to determine whether the received query statement is associated with the pivot table in response to finding the pivot table in which the BLOB data is stored, by analyzing the received query statement; and automatically generate a first subquery statement for querying a pivot name table including at least pivot column name information and a second subquery statement for querying a pivot meta table including at least internal storage type information of the pivot table, in response to determining that the received query statement is associated with the pivot table;

where the pivot name table query module is configured to determine name information for one or more columns generated as a result of a pivot operation included in respective pivot columns of the pivot table by querying a pivot name table for the pivot table based on the generated first subquery statement;

where the pivot meta table query module is configured to determine internal storage type information of the pivot table by querying a pivot meta table for the pivot table based on the generated second subquery statement; and where the output information generating module is configured to generate output information for the BLOB data corresponding to the query statement based on the determined name information and internal storage type information.

10. A method for executing a query statement in a DBMS, the method comprising:
receiving the query statement for requesting BLOB data serialized to a binary large object (BLOB) type and stored in a pivot table, wherein the pivot table include the BLOB data at a place where a pivoted data set is to be stored, in lieu of the pivoted data set so that the BLOB data functions as the pivoted data set;

determining whether the received query statement is associated with the pivot table in response to finding the pivot table in which the BLOB data is stored, by analyzing the received query statement;

automatically generating a first subquery statement for querying a pivot name table including at least pivot column name information and a second subquery statement for querying a pivot meta table including at least internal storage type information of the pivot table, in response to determining that the received query statement is associated with the pivot table;

determining name information for one or more columns generated as a result of a pivot operation included in respective pivot columns of the pivot table by querying a pivot name table for the pivot table based on the generated first subquery statement;

determining internal storage type information of the pivot table by querying a pivot meta table for the pivot table based on the generated second subquery statement; and generating output information for the BLOB data corresponding to the query statement based on the determined name information and internal storage type information.

* * * * *